United States Patent
Ushioda (10) Patent No.: US 10,656,817 B2
(45) Date of Patent: May 19, 2020

(54) DISPLAY CONTROL DEVICE, DISPLAY CONTROL METHOD, AND PROGRAM

(75) Inventor: Takahiro Ushioda, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 1496 days.

(21) Appl. No.: 13/993,118

(22) PCT Filed: Dec. 19, 2011

(86) PCT No.: PCT/JP2011/007067
§ 371 (c)(1),
(2), (4) Date: Jun. 11, 2013

(87) PCT Pub. No.: WO2012/093446
PCT Pub. Date: Jul. 12, 2012

(65) Prior Publication Data
US 2013/0257912 A1    Oct. 3, 2013

(30) Foreign Application Priority Data
Jan. 5, 2011   (JP) ................................ 2011-000752

(51) Int. Cl.
*G06F 3/0485* (2013.01)
*G06F 3/0488* (2013.01)

(52) U.S. Cl.
CPC .......... *G06F 3/0485* (2013.01); *G06F 3/0488* (2013.01); *G06F 3/04855* (2013.01)

(58) Field of Classification Search
CPC ................................................. G01C 21/367
USPC ....................................................... 345/684
See application file for complete search history.

(56) References Cited

U.S. PATENT DOCUMENTS

| | | | |
|---|---|---|---|
| 4,825,381 A * | 4/1989 | Bottorf et al. | 701/532 |
| 5,913,918 A * | 6/1999 | Nakano et al. | 701/454 |
| 6,016,110 A * | 1/2000 | Takinami | 340/995.16 |
| 6,351,273 B1 | 2/2002 | Lemelson et al. | |
| 2001/0028350 A1* | 10/2001 | Matsuoka et al. | 345/427 |
| 2003/0043174 A1 | 3/2003 | Hinckley et al. | |
| 2004/0169689 A1* | 9/2004 | Kim et al. | 345/905 |
| 2006/0007174 A1* | 1/2006 | Shen | G06F 3/04883 345/173 |
| 2008/0165150 A1 | 7/2008 | Kwon | |
| 2008/0243375 A1* | 10/2008 | Han | 701/208 |

(Continued)

FOREIGN PATENT DOCUMENTS

| | | |
|---|---|---|
| CN | 101217730 A | 7/2008 |
| CN | 101470570 | 7/2009 |

(Continued)

OTHER PUBLICATIONS

Japanese Office Action dated Sep. 24, 2014, in Japan Patent Application No. 2011-000752.

(Continued)

*Primary Examiner* — Javid A Amini
(74) *Attorney, Agent, or Firm* — Oblon, McClelland, Maier & Neustadt, L.L.P.

(57) ABSTRACT

An apparatus includes a display control unit, including a processor, configured to control a display to display an image on a screen and to scroll the image toward a target position. The display control unit is configured to scroll the image with a scroll speed based on a difference between a current position and the target position.

10 Claims, 6 Drawing Sheets

(56) References Cited

U.S. PATENT DOCUMENTS

| | | | | |
|---|---|---|---|---|
| 2009/0292990 A1* | 11/2009 | Park et al. | ................... | 715/702 |
| 2009/0319888 A1* | 12/2009 | Oygard | ........................ | 715/252 |
| 2010/0259500 A1* | 10/2010 | Kennedy | ....................... | 345/173 |
| 2013/0283205 A1* | 10/2013 | Suzuno | ........................ | 715/784 |

FOREIGN PATENT DOCUMENTS

| | | | | |
|---|---|---|---|---|
| CN | 101539834 | | 9/2009 | |
| EP | 1942403 A2 * | | 7/2008 | ......... G06F 3/04855 |
| JP | 2-146591 | | 6/1990 | |
| JP | 4-42323 | | 2/1992 | |
| JP | 2005-251008 | | 9/2005 | |
| JP | 2007-279637 | | 10/2007 | |
| KR | 20030088374 | | 11/2003 | |
| KR | 20080064311 | | 7/2008 | |

OTHER PUBLICATIONS

International Search Report dated Apr. 3, 2012 in PCT/JP2011/007067.
Chinese Office Action dated Jul. 21, 2015 in patent application No. 201180063354.5.
Combined Office Action and Search Report dated Mar. 10, 2016 in Chinese patent Application No. 201180063354.5 (with English translation).
Partial European Search Report dated Jul. 28, 2016, in European Application No. 11854704.1 based on PCT/JP11/07067, 7 pages.

\* cited by examiner

DISPLAY CONTROL DEVICE, DISPLAY CONTROL METHOD, AND PROGRAM

CROSS REFERENCE TO RELATED APPLICATIONS

The present disclosure claims priority to under 35 U.S.C. § 119 and contains subject matter related to that disclosed in Japanese Priority Patent Application JP 2011-000752 filed in the Japanese Patent Office on Jan. 5, 2011, the entire content of which is hereby incorporated by reference.

TECHNICAL FIELD

The present disclosure relates to a display control device, a display control method, and a program stored on a computer readable medium.

BACKGROUND ART

In recent years, information processing devices that display content within application windows, such as portable terminals or PCs (Personal Computers), have come into widespread use. Examples of content include Web pages and playback list screens for music data. However, there may be cases in which the display size of the entire content is larger than the size of the application window. In such a case, by operating a scroll bar included in the application window, for example, a user can scroll the content within the application window.

With the aforementioned scroll bar, content is scrolled such that the relative position of a portion of the content, which is displayed within the application window, with respect to the entire content is equal to the relative position of the knob with respect to the entire scroll bar.

Therefore, when it is difficult to secure a sufficient height (or width) of the scroll bar or when the volume of the content is large, the ratio of a change in the display position of the content to the movement distance of the knob along the height (or width) of the scroll bar becomes high, so that fine control of the display position of the content by a knob operation becomes difficult.

As a technique related to fine control of the display position of content in such a scroll display, Patent Literature 1 and 2 below each discloses a technique of backward scrolling the content by a predetermined amount after a scroll stop operation. Accordingly, even when scrolling beyond an intended position occurs, cumbersome operations need not be performed.

CITATION LIST

Patent Literature

PTL 1: JP H02-146591A
PTL 2: JP 2005-251008A

SUMMARY

Technical Problem

As described above, as fine control of the display position of content in a scroll display is difficult to perform, it is also difficult for users to smoothly scroll the content while checking information of the content.

Further, there is also known a technique of scrolling content at a delayed timing after a user's scroll operation. However, with this technique, content is scrolled at a delayed timing, i.e., after a predetermined time has elapsed regardless of the difference between the current display position and the target display position of the content. Thus, it is impossible to perform control for jumping to the desired display position of the content or slowly scrolling the content while checking information of the content.

In light of the foregoing, it is desirable to provide a display control device, a display control method, and a program that are novel and improved and that can control the properties of following the display position of content in response to an operation of specifying the target display position.

Solution to Problem

The present invention broadly comprises an apparatus, a method, and a computer readable medium encoded with a program. In one embodiment, the apparatus includes a display control unit, including a processor, configured to control a display to display an image on a screen and to scroll the image toward a target position. The display control unit is configured to scroll the image with a scroll speed based on a difference between a current position and the target position.

Advantageous Effects of Invention

According to the embodiments of the present disclosure described above, it is possible to control the properties of following the display position of content in response to an operation of specifying the target display position.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

The description will be given in the following order.
1. Basic Configuration of the Display Control Device
2. First Embodiment
3. Second Embodiment
4. Conclusion

[1. Basic Configuration Of The Display Control Device That Is Common To Each Embodiment Of The Present Disclosure]

The present disclosure can be implemented in various forms as exemplarily described in "2. First Embodiment" to "3. Second Embodiment." In addition, the display control device described in each embodiment has the following features:

A: Includes a movement amount calculation unit (a content display position calculation unit 104) that calculates, in accordance with the difference between the current display position of content on a screen and the target display position of the content specified by a user, the amount of movement of the display position per unit time from the current display position to the target display position.

B: The proportion of the amount of movement of the display position calculated by the movement amount calculation unit to the aforementioned difference varies according to the magnitude of the difference.

Hereinafter, such a basic configuration common to each embodiment will be described first with reference to FIGS. 1 to 3.

(Summary of the Display Control Device)

Figure 1:
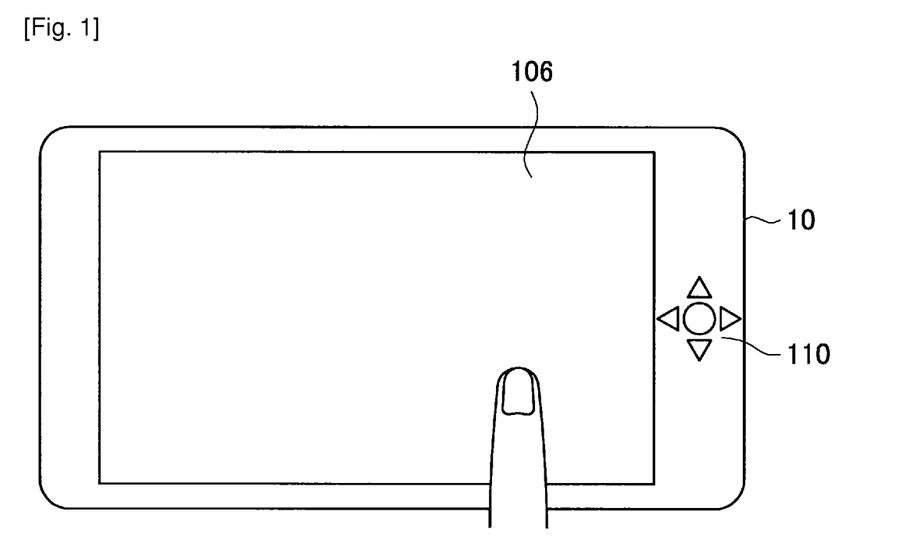
FIG. 1 is an external view of a display control device that is common to each embodiment of the present disclosure.

FIG. 1 is an external view of a display control device 10 in accordance with this embodiment. The display control device 10 is a tablet terminal having a display unit 106 as shown in FIG. 1. The display unit 106 has a configuration of a touch panel that acquires the positional information of an input object, such as a finger put on the screen, and receives an operation input by the user. Further, the display control device 10 can also include an operation button 110 that receives an operation input by the user.

In regard to a device having a small touch panel display like the display control device 10, when content is too large to be displayed within a single application window, a scroll bar, which moves the display position of the content, can be displayed within the application window so that the entire content can be scroll-displayed.

Herein, as described above, when it is difficult to secure a sufficient height (or width) of the scroll bar or when the volume of the content is large, the ratio of a change in the display position of the content to the movement distance of the knob along the height (or width) of the scroll bar becomes high, so that fine control of the display position of the content by a knob operation becomes difficult. In particular, in regard to a device having a small touch panel display like the display control device 10 in accordance with this embodiment, there may be many cases in which it is difficult to secure a sufficient height (width) of the scroll bar. In addition, when the knob is operated directly by a finger, a stylus, or the like, in particular, accurate operations are difficult to perform.

Figure 9:
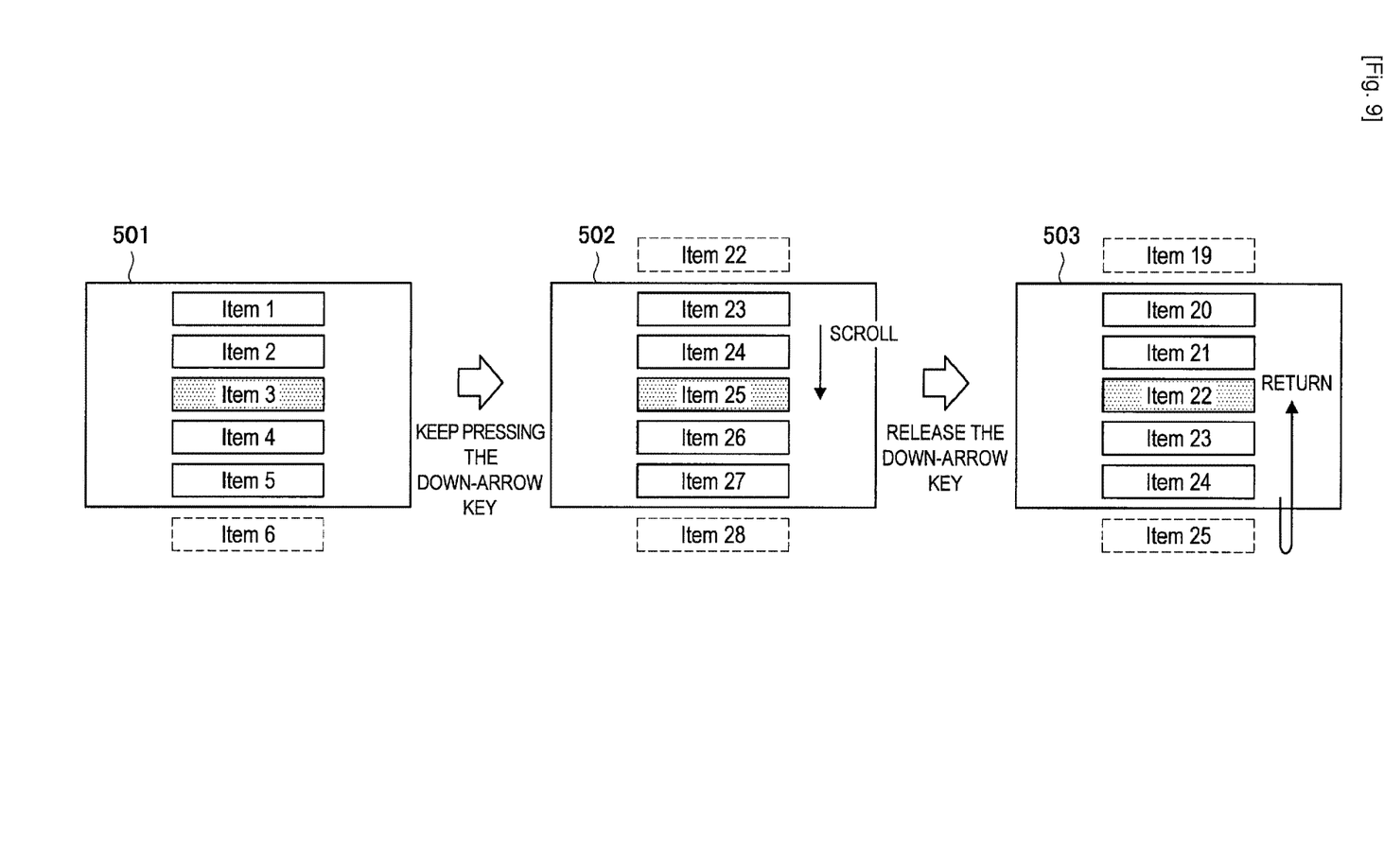
FIG. 9 is a diagram illustrating the conventional scroll display control.

Further, in regard to fine control of the display position of content in a scroll display, Patent Literature 1 and 2 above each discloses a technique of backward scrolling the content by a predetermined amount (or a predetermined number of lines) after a scroll stop operation, and then stopping the scrolling (see FIG. 9). Accordingly, even when scrolling beyond an intended position occurs, cumbersome operations need not be performed.

Furthermore, in regard to fine control of the display position of content in a scroll display, there is known a technique of scrolling content at a delayed timing, i.e., after a predetermined time has elapsed since a user's scroll operation. However, with this technique, content is scrolled at a delayed timing, i.e., after a predetermined time has elapsed regardless of the difference between the current display position and the target display position of the content. Thus, it is impossible to perform control for jumping to the desired display position of the content or slowly scrolling the content while checking information of the content.

Thus, in order to solve the aforementioned problems, the inventor has arrived at a display control device that can control the properties of following the display position of content in response to an operation of specifying the target display position.

(Configuration of the Display Control Device)

Figure 2:
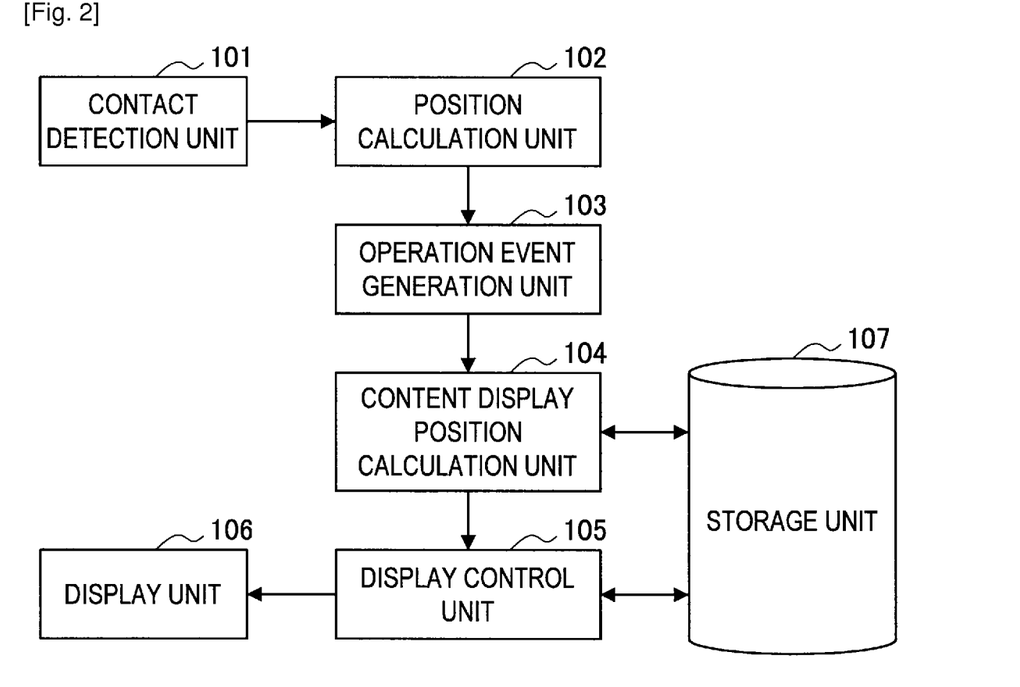
FIG. 2 is a block configuration diagram of a display control device that is common to each embodiment of the present disclosure.

FIG. 2 is a block configuration diagram of the display control device 100 in accordance with this embodiment. As shown in FIG. 2, the display control device 10 includes a contact detection unit 101, a position calculation unit 102, an operation event generation unit 103, a content display position calculation unit 104, a display control unit 105, a display unit 106, and a storage unit 107.

The contact detection unit 101 detects a contact of an input object, such as a finger of a user, with the display unit 106, and outputs the detection result to the position calculation unit 102. For example, when the display unit 106 is a resistive touch panel, a change in the voltage at the position of contact of the input object is detected.

The position calculation unit 102 determines which position on the display screen was touched from the detection result output from the contact detection unit 101, and outputs the positional information to the operation event generation unit 103.

The operation event generation unit 103 determines a user's operation from the positional information output from the position calculation unit 102, and generates an operation event. Specifically, the operation event generation unit 103 determines a user's operation, i.e., whether an input object has touched the screen, whether an input object has moved while touching the screen (a drag operation), or whether an input object has been lifted off the screen, from the current positional information and the previous positional information, and then generates an operation event according to at which position on the display screen the operation was performed. The operation event generation unit 103 outputs the thus generated operation event to the content display position calculation unit 104.

The content display position calculation unit 104, when the operation event output from the operation event generation unit 103 is an operation event specifying the target display position of the content through a knob operation, calculates the amount of movement of the display position per unit time from the current display position to the target display position, in accordance with the difference between the current display position of the content on the screen and the target display position of the content specified by the user. Further, the display position of the content is calculated from the amount of movement of the display position. Note that the proportion of the amount of movement of the display position calculated by the movement amount calculation unit to the aforementioned difference varies according to the magnitude of the difference. The content display position calculation unit 104 outputs the thus calculated display position to the display control unit 105.

The operation of specifying the target display position of the content is performed by operating the knob of the scroll bar. More specifically, the relative position of the displayed area of the content with respect to the entire content that is equal to the relative position of the knob with respect to the scroll bar is designated as the target display position. Hereinafter, the operation of the knob of the scroll bar will be described with reference to FIG. 3.

Figure 3:
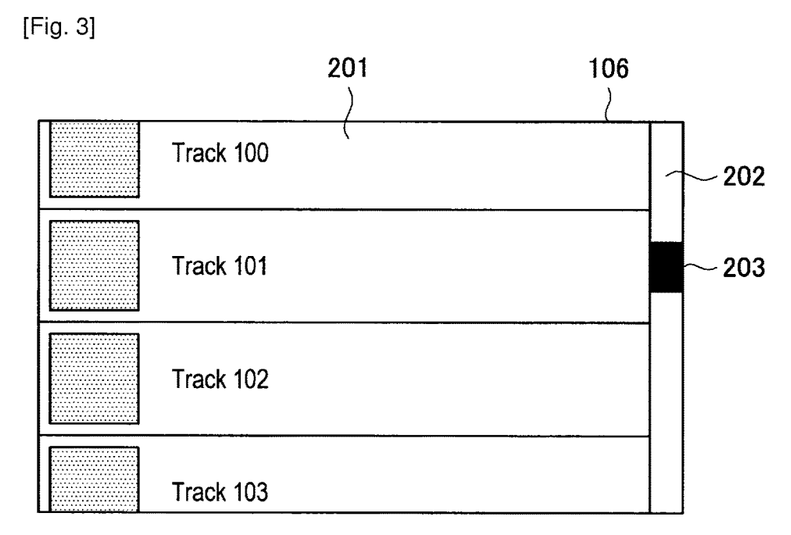
FIG. 3 is a diagram showing an exemplary display screen that is common to each embodiment of the present disclosure.

FIG. 3 is a diagram showing an exemplary screen displayed on the display unit 106 of the display control device 10 in accordance with this embodiment. In the exemplary screen shown in FIG. 3, a list is displayed as an example of content on the display screen of the display unit 106, and a scroll bar 202 is displayed at an end of the display screen. Further, a knob 203 that is movable in the vertical direction by a drag operation is displayed on the scroll bar 202. The relationship between the position of the knob 203 and the display position of the content will be described hereinafter.

First, when the knob 203 is not operated, display of the relative position $y_s$ of the knob 203 with respect to the height of the scroll bar 202 is controlled so that it is equal to the relative position $y_c$ of the displayed area of the content with respect to the entire content. That is, when the current display position of the content is 30% (from the top) of the height of the entire content, the position of the knob 203 will also be 30% (from the top) of the scroll bar 202. Hereinafter, $0 \leq y_s \leq 1$ and $0 \leq y_c \leq 1$ are satisfied, where the relative positions of the uppermost portion and the lowermost portion of the content or the scroll bar are 0 and 1, respectively.

Meanwhile, while a user is operating the knob 203, display control is performed so that $y_s$ (the relative position specified by the knob 203)=$y_c$ (the relative position $y_c$ of the content) is satisfied following or immediately after the operation of the knob 203.

The aforementioned process of the content display position calculation unit 104 will be described in further detail in "2. First Embodiment" to "3. Second Embodiment."

The display control unit 105 generates a display screen from the content stored in the storage unit 107 on the basis of the information on the display position output from the content display position calculation unit 104, and outputs the display screen to the display unit 106. Next, the display unit 106 displays the display screen output from the display control unit 105.

Each configuration of the display control device 10 has been described above. The display control device 10 can be typically implemented by a combination of hardware and software. The contact detection unit 101 can be implemented by, for example, a thin metal film (resistive film) forming a transparent electrode. The position calculation unit 102, the operation event generation unit 103, the content display position calculation unit 104, and the display control unit 105 can be implemented by a CPU, RAM, and ROM. For example, the CPU controls the entire operation of the display control device 10. In addition, the ROM stores a program and data for controlling the operation of the display control device 10, and the RAM temporarily stores a program and data during execution of a process by the CPU. The display unit 106 can be implemented by any display such as a liquid crystal display, a plasma display, an organic EL display, or an FED.

[2. First Embodiment]

Next, display control in accordance with the first embodiment of the present disclosure will be described with reference to FIG. 4 to FIG. 8.

(Operation Process)

Figure 4:
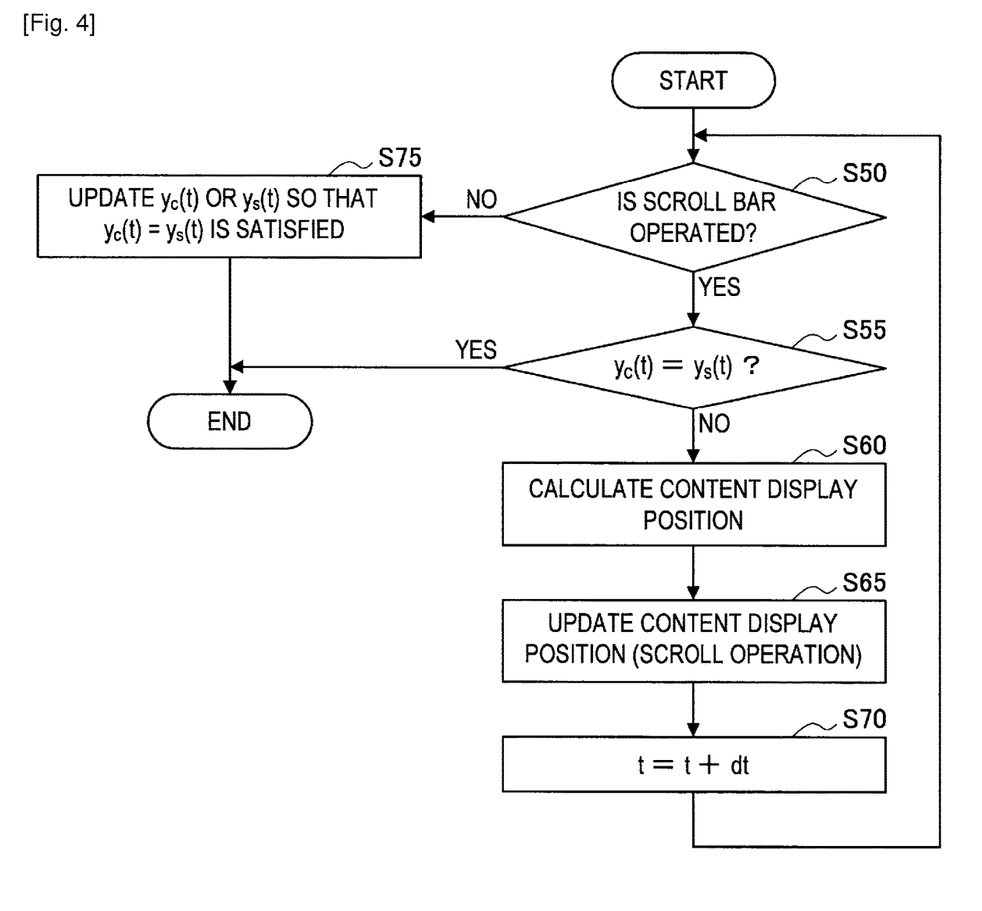
FIG. 4 is a flowchart showing a display control process in accordance with the first embodiment of the present disclosure.

First, as shown in the flowchart of FIG. 4, the operation event generation unit 103 determines if the scroll bar is operated in step S50. Herein, not only when an input object is performing an operation of dragging the knob 203 while being in contact with the screen, but also when the input object is hovering over the knob 203, the scroll bar is determined to be "operated," and the flow proceeds to step S55.

Next, in step S55, if $y_s=y_c$ is determined. That is, if the relative position $y_s$ of the knob 203 with respect to the scroll bar 202 is equal to the relative position $y_c$ of the displayed area of the content with respect to the entire content is determined. If the determination is negative, the flow proceeds to step S60.

Next, in step S60, the content display position calculation unit 104 calculates the display position of the content. The process of the content display position calculation unit 104 is described below with reference to FIG. 6 to FIG. 8.

Next, in step S65, the display control unit 105 updates the display position of the content, which is currently displayed on the display unit 106, in accordance with the display position output from the content display position calculation unit 104, and performs a scroll operation.

Next, in step S70, time t is incremented to t+dt, and the flow returns to step S50.

Meanwhile, if the scroll bar is not operated in step S50 (if the input object is off the screen), the flow proceeds to step S75. Next, in step S75, the display position $y_c(t)$ of the content or the position $y_s(t)$ of the knob 203 of the scroll bar is updated so that $y_s=y_c$ (the current display position of the content=target display position) is satisfied.

Figure 5:
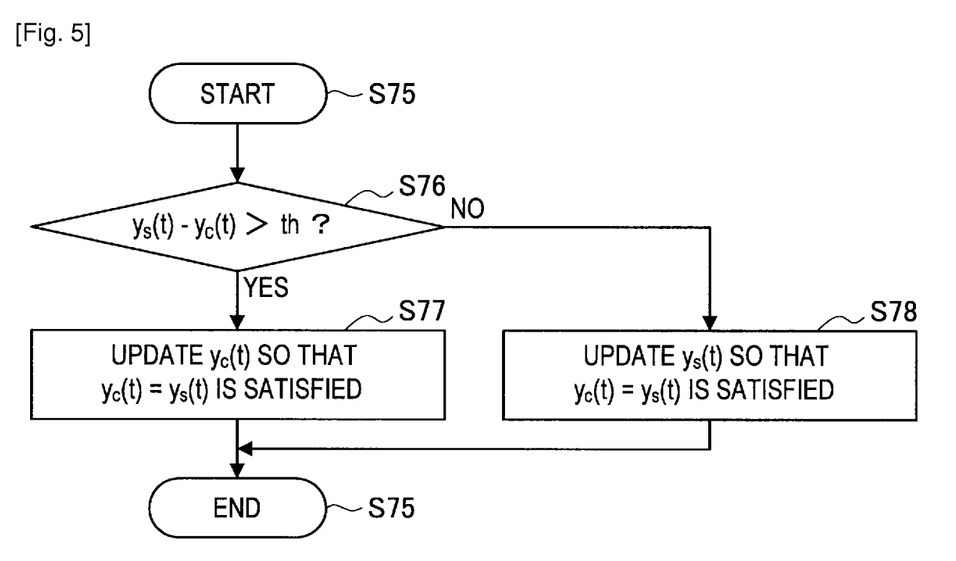
FIG. 5 is a flowchart showing a display control process in accordance with the embodiment.

Next, step S75 will be described in detail with reference to FIG. 5. As shown in FIG. 5, if the content display position calculation unit 104 has determined that the difference between the current display position and the target display position is greater than a threshold th in step S76, the flow proceeds to step S77. Next, in step S77, the display control unit 105 updates the display position $y_c(t)$ of the content so that $y_s=y_c$ is satisfied. Meanwhile, if the content display position calculation unit 104 has determined that the difference between the current display position and the target display position is less than the threshold th in step S76, the flow proceeds to step S78. Next, in step S78, the display control unit 105 updates the position $y_s(t)$ of the knob 203 of the scroll bar so that $y_s=y_c$ is satisfied.

(Process of the Content Display Position Calculation Unit 104)

Next, the process of the content display position calculation unit 104 will be described with reference to FIG. 6 and FIG. 8.

Figure 6:
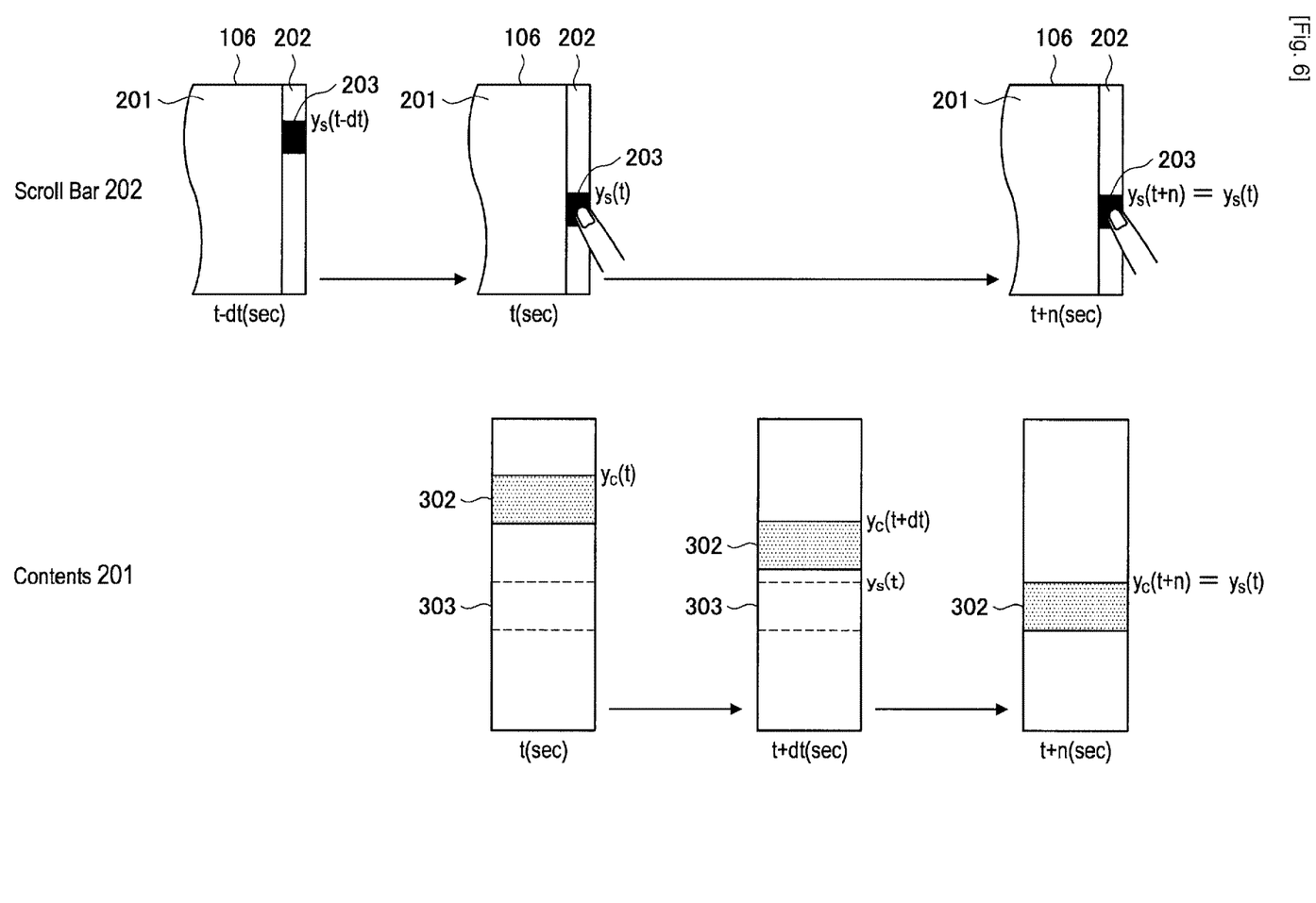
FIG. 6 is a diagram illustrating display control in accordance with the embodiment.

First, the upper half of FIG. 6 shows the transition diagrams of the operation of the knob 203 of the scroll bar 202, and the lower half of FIG. 6 shows the transition diagrams of the movement (scroll operation) of the display position of the content in accordance with the operation of the knob 203. In the transition diagrams of the movement of the display position of the content shown in the lower half of FIG. 6, a display position 302 indicates the current display position, and a display position 303 indicates the target display position.

In this embodiment, as shown in the upper half of FIG. 6, it is assumed that the knob 203 is operated by a user from $y_s(t-dt)$ to $y_s(t)$ during the minimum resolvable time dt, and then the knob 203 remains at the same position until time t+n is reached. At this time, as shown in the lower half of FIG. 6, the relative position $y_c(t+dt)$ of the display position (display area) 302 of the content at time t+dt is represented by the following formula using the relative position $y_c(t)$ of the current display position 302 and the relative position $y_s(t)$ of the knob 203 at time t, as well as a given parameter alpha (hereinafter referred to as "a").

[Math.1]

$$y_c(t+dt) = y_c(t) + \alpha(y_s(t) - y_c(t)) \quad \text{Formula 1}$$

From Formula 1 above, the scroll speed $v_c(t)$ of $y_c$ can be represented by the following Formula 2.

[Math. 2]

$$v_c(t) = \frac{y_c(t+dt) - y_c(t)}{dt} = \alpha \frac{y_s(t) - y_c(t)}{dt} \quad \text{Formula 2}$$

Accordingly, it is understood that the scroll speed $v_c(t)$ of $y_c$ (the display position of the content) is determined by the difference between $y_s$ and $y_c$ (the difference between the current display position and the target display position) at a particular point in time, as well as the parameter a (the proportion of the amount of movement of the display position per unit time to the aforementioned difference). The parameter a can converge $y_c$ as long as it is a value that satisfies $$0 < a \leq 1.$$

However, in this embodiment, in particular, the value of the parameter a is determined in accordance with the difference between the current display position and the target display position in order to increase the operability of the scroll bar. Hereinafter, the value of the parameter a determined in accordance with the difference between the current display position and the target display position will be described with reference to FIG. 7. Note that FIG. 8 is a graph representation of the scroll speed $v_c(t)$ of $y_c$ (the display position of the content) calculated using the parameter a shown in FIG. 7.

((1) When the Difference Between $y_s$ and $y_e$ is Small)

Figure 7:
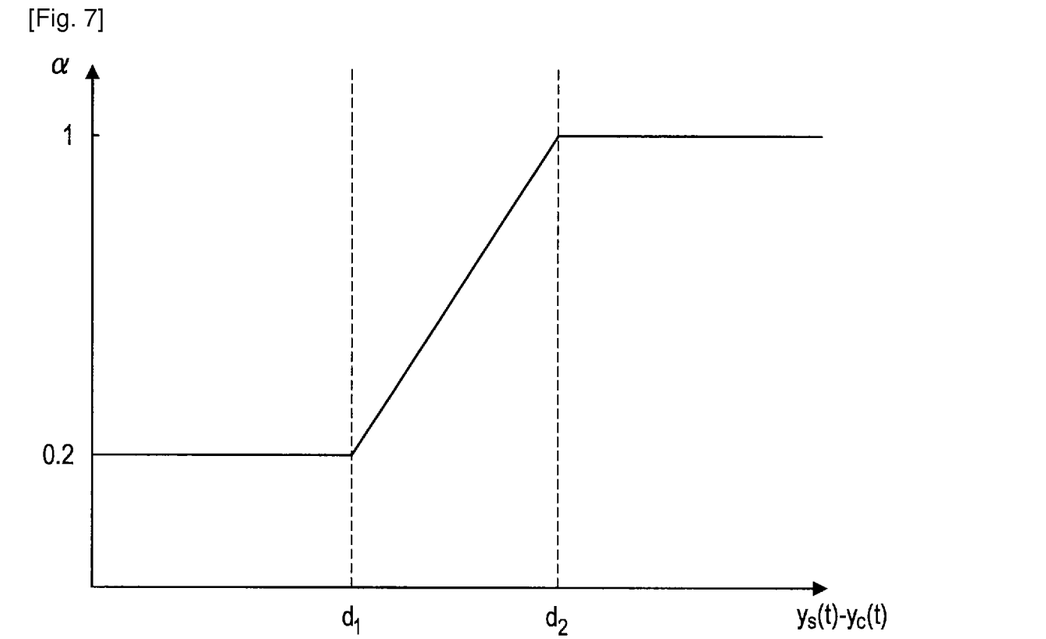
FIG. 7 is a graph representation of a parameter alpha in accordance with the embodiment.

First, a case in which the difference between the current display position and the target display position is below a threshold d1 (a second threshold) will be described. In this case, the amount of movement of the knob 203 per unit time dt is small, and it can thus be said that the user has operated the knob 203 slowly. Therefore, it is highly probable that the user is operating the knob 23 while checking information of the content. With such a possibility taken into consideration, the parameter a is determined as a constant that is less than 1 that allows the speed $v_c$ of $y_c$ to be most suitable for browsing. For example, as shown in FIG. 7, the value of the parameter a when the difference between the current display position and the target display position is below the threshold d1 is set to 0.2. Note that such value of the parameter a can be determined from the ratio between the height ($h_s$) of the scroll bar and the height ($h_c$) of the content. For example, the value of the parameter a is determined as shown in the following Formula 3.

[Math. 3]

$$\beta \frac{h_s}{h_c} \quad \text{Formula 3}$$

((2) When the Difference Between $y_s$ and $y_c$ is Sufficiently Large)

Next, a case in which the difference between the current display position and the target display position is greater than a threshold d2 (a first threshold), which is greater than the threshold d1, will be described. In this case, the amount of movement of the knob 203 per unit time dt is large, and it can thus be said that the user has operated the knob 203 quickly. Therefore, it is highly probable that the user is operating the knob 203 with the intention to jump to a given display position of the content. With such a possibility taken into consideration, the parameter a is set to 1 (a=1) so that $y_c(t+dt) = y_s(t)$ is satisfied (see FIG. 7).

((3) Case in which the Difference Between $y_s$ and $y_c$ is Between (1) and (2) Above)

Next, a case in which the difference between the current display position and the target display position is a value between the threshold d1 and the threshold d2 will be described. In this case, the value of the parameter a is set to a value that changes $v_c$ at an accelerated pace so that the value of the parameter a of (1) and the value of the parameter a of (2) are continuously connected. That is, the value of the parameter a is set to a value determined from a function that changes the value of the parameter a from the value of the parameter a of (2) to the value of the parameter a of (1). For example, the value of the parameter a is determined as represented by the following Formula 4 from the current display position $y_s$ and the target display position $y_c$.

[Math.4]

$$(y_s - y_c)^2 \quad \text{Formula 4}$$

Figure 8:
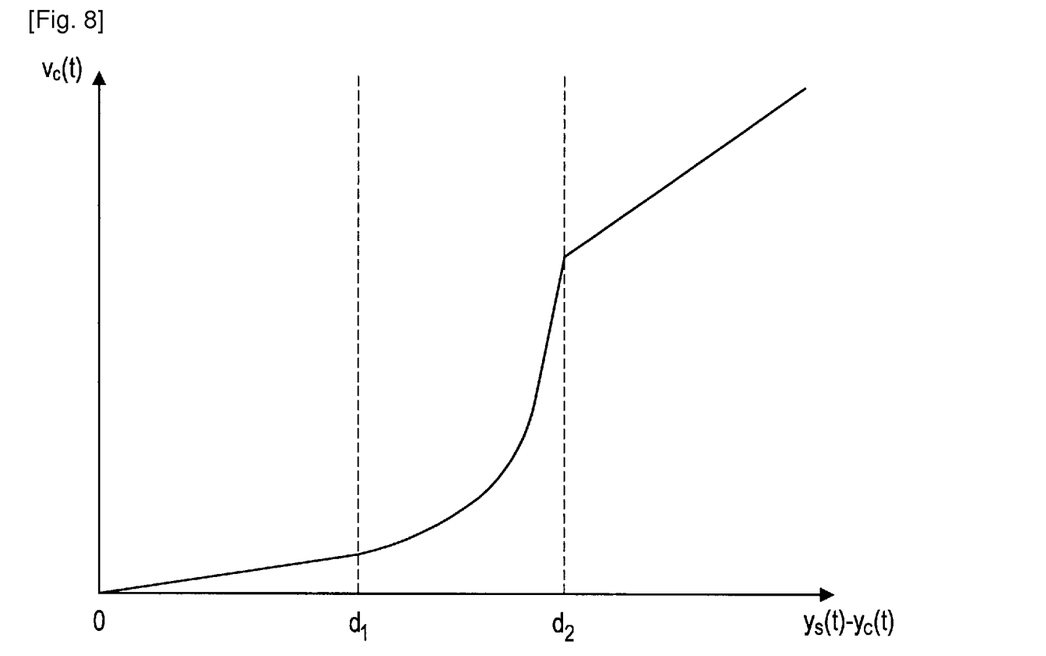
FIG. 8 is a graph representation of the scroll speed in accordance with the embodiment.

FIG. 7 shows an exemplary change in the value of the parameter a described in (1) to (3) above, and FIG. 8 shows a change in the scroll speed $v_c(t)$ calculated using the value of the parameter a. Note that the thresholds d1 and d2 can be any values as long as $$0 < d1 < d2 \leq 1$$

is satisfied.

[3. Second Embodiment]

The first embodiment has described a change in the speed of $y_c$ (a change in the scroll speed of the display position of the content) in accordance with the positional relationship between $y_c$ and $y_s$ (the current display position and the target display position). However, as shown in FIG. 8, the smaller the difference between $y_c$ and $y_s$ (the current display position and the target display position), the lower the speed $v_c$. Thus, even if the knob is moved quickly, the speed is low around the converged value of $y_c$. Thus, $v_c$ is made to have inertia. That is, the speed $v_c(t)$ of $y_c$ at a given point in time t depends on the previous speed $v_c(t-dt)$ (speed at the time earlier by the minimum resolvable time dt). Provided that the degree of influence of the speed in the past is x, the current speed can be represented by the following Formula 5 from Formula 2 above.

[Math. 5]

$$v_c(t) = \frac{\alpha \frac{y_s(t) - y_c(t)}{dt} + \chi v_c(t-dt)}{\chi + 1} \quad \text{Formula 3}$$

Accordingly, when the knob is moved quickly, $y_c$ can also be converged rapidly. Further, there is another advantage that there will be less influence of a sudden change in the value due to noise or the like. Note that when the amount of movement of the display position is greater than the difference between the current display position and the target display position, overshoot can be avoided by setting the amount of movement of the display position such that it is within the difference.

<4. Conclusion>

According to each of the aforementioned embodiments, it is possible to control the properties of following the display position of content in response to an operation of specifying the target display position. Accordingly, it is possible to intuitively realize scrolling of content while information of the content is viewed at the same time, and scrolling for jumping to a given display position of the content, thereby improving the operation efficiency.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the display unit 106 can be a contactless touch panel. In that case, if an input object is not detected above the knob in step S50, the scroll bar (or the knob thereof) is determined to be not operated.

Further, the display control device 10 is not limited to the tablet terminal shown in FIG. 1. For example, the display control device 10 can be a user device with a display unit such as, for example, a portable phone, a portable game machine, a music player, or a remote controller.

For example, the present technology can adopt the following configurations.

(1) A display control device comprising a movement amount calculation unit configured to calculate, in accordance with a difference between a current display position of content on a screen and a target display position of the content specified by a user, an amount of movement of the display position per unit time from the current display position to the target display position, wherein a proportion of the amount of movement of the display position calculated by the movement amount calculation unit to the difference varies according to a magnitude of the difference.

(2) The display control device according to the (1), wherein the movement amount calculation unit:
sets, if the difference is above a first threshold, the proportion to a first value, and sets, if the difference is below the first threshold, the proportion to a value that is less than the first value, and
calculates the amount of movement of the display position in accordance with the set proportion.

(3) The display control device according to the (2), wherein the movement amount calculation unit:
sets, if the difference is below a second threshold that is less than the first threshold, the proportion to a second value that is less than the first value, and
sets, if the difference is in a range between the second threshold and the first threshold, the proportion to a value determined from a function that changes from the second value to the first value in the range between the second threshold and the first threshold.

(4) The display control device according to any one of the (1) to (3), further comprising an operation detection unit configured to detect an operation of the user to specify the target display position.

(5) The display control device according to the (4), wherein the operation detection unit detects a relative position of a knob operated by the user with respect to a scroll bar, and detects, as the target display position specified by the user, a relative display position of the content with respect to the entire content corresponding to the relative position of the knob with respect to the scroll bar.

(6) The display control device according to any one of the (1) to (5), wherein the movement amount calculation unit calculates the amount of movement of the display position such that the amount of movement of the display position depends on an amount of previous movement of the display position during movement to the target display position.

(7) A display control method comprising calculating, in accordance with a difference between a current display position of content on a screen and a target display position of the content specified by a user, an amount of movement of the display position per unit time from the current display position to the target display position, wherein a proportion of the amount of movement of the display position calculated in the calculating step to the difference varies according to a magnitude of the difference.

(8) The display control method according to the (7), wherein the calculating step includes:
setting, if the difference is above a first threshold, the proportion to a first value, and setting, if the difference is below the first threshold, the proportion to a value that is less than the first value, and
calculating the amount of movement of the display position in accordance with the set proportion.

(9) The display control method according to the (8), wherein the calculating step includes:
setting, if the difference is below a second threshold that is less than the first threshold, the proportion to a second value that is less than the first value, and
setting, if the difference is in a range between the second threshold and the first threshold, sets the proportion to a value determined from a function that changes from the second value to the first value in the range between the second threshold and the first threshold.

(10) The display control method according to the (7), further comprising detecting an operation of the user to specify the target display position.

(11) The display control method according to the (10), wherein the detecting step includes:
detecting a relative position of a knob operated by the user with respect to a scroll bar, and
detecting, as the target display position specified by the user, a relative display position of the content with respect to the entire content corresponding to the relative position of the knob with respect to the scroll bar.

(12) The display control method according to any one of the (7) to (11), wherein the calculating step includes calculating the amount of movement of the display position such that the amount of movement of the display position depends on an amount of previous movement of the display position during movement to the target display position.

(13) A program for causing a computer to execute a process of calculating, in accordance with a difference between a current display position of content on a screen and a target display position of the content specified by a user, an amount of movement of the display position per unit time from the current display position to the target display position, wherein a proportion of the amount of movement of the display position calculated in the calculating process to the difference varies according to a magnitude of the difference.

The invention claimed is:

1. An apparatus comprising:
a display control unit, including a processor, configured to control a display to display an image on a screen and to scroll the image toward a target position, the display control unit configured to scroll the image with a scroll speed equal to a proportionality constant α times a difference between a current position and the target position, wherein the proportionality constant α varies based on the difference between the current position and the target position.

2. The apparatus according to claim 1, wherein the proportionality constant α is equal to a first constant in an event the difference between the current position and the target position is below a first value, is equal to a varying value in an event the difference between the current position and the target position is between the first value and a second value, and is equal to a second constant in an event the difference between the current position and the target position is above the second value.

3. The apparatus according to claim 1, wherein the scroll speed is dependent on a previous speed in an event the difference between the current position and the target position is less than a first value, wherein the previous speed is a speed determined at a predetermined time prior to a current time corresponding to a current scroll location, and wherein the scroll speed is equal to an increasing value in an event the difference between the current position and the target position is greater than the first value.

4. The apparatus according to claim 1, wherein the scroll speed $v_c(t)$ is equal to:

$$v_c(t) = \frac{\alpha \frac{y_s(t) - y_c(t)}{dt} + \chi v_c(t - dt)}{\chi + 1} \quad \text{Formula 5}$$

in an event the difference between the current position and the target position is less than a first value, where $v_c(t-dt)$ is a previous speed, $y_s$ is the target position, $y_c$ is the current position, and α and χ are proportionality constants, and the scroll speed is equal to an increasing value in an event the difference between the current position and the target position is greater than the first value, wherein the previous speed is a speed determined at a predetermined time prior to a current time corresponding to a current scroll location.

5. The apparatus according to claim 1, wherein the display control unit is configured to control the display to display a scroll knob within a scroll bar which is located along one edge of the display.

6. The apparatus according to claim 5, wherein the display control unit is configured to control the display to display a rectangular scroll knob located within the scroll bar proportional to a scroll location.

7. The apparatus according to claim 5, wherein the display control unit is configured to control the display to scroll the image based on movement of the scroll knob by a user.

8. The apparatus according to claim 1, wherein the scroll speed is dependent on a previous speed, wherein the previous speed is a speed determined at a predetermined time prior to a current time corresponding to a current scroll location.

9. A method comprising:

controlling, using a processor, a display to display an image on a screen and to scroll the image toward a target position, the controlling including scrolling the image with a scroll speed based on a difference between a current position and the target position, wherein the scroll speed is equal to a proportionality constant α times a difference between the current position and the target position, wherein the proportionality constant α varies based on the difference between the current position and the target position.

10. A non-transitory computer readable medium encoded with a set of instructions that, when loaded on a processor, causes the processor to perform a method comprising:

controlling, using a processor, a display to display an image on a screen and to scroll the image toward a target position, the controlling including scrolling the image with a scroll speed based on a difference between a current position and the target position, wherein the scroll speed is equal to a proportionality constant α times a difference between the current position and the target position, wherein the proportionality constant α varies based on the difference between the current position and the target position.

* * * * *